United States Patent [19]
Kubby et al.

[11] Patent Number: 5,744,732
[45] Date of Patent: Apr. 28, 1998

[54] SHEET MATERIALS TRANSPORT SYSTEM

[75] Inventors: Joel A. Kubby, Rochester, N.Y.; Eric Peeters, Mountain View, Calif.; R. Enrique Viturro; Fred F. Hubble, III, both of Rochester, N.Y.; Stanley J. Wallace, Victor, N.Y.; Alan J. Werner, Jr., Rochester, N.Y.; Warren B. Jackson, San Francisco, Calif.; David K. Biegelsen, Portola Valley, Calif.; Lars-Erik Swartz, Sunnyvale, Calif.; Raj B. Apte, Palo Alto, Calif.; Robert A. Sprague, Saratoga, Calif.; James G. Chase, Palo Alto, Calif.

[73] Assignee: Xerox Corporation, Stamford, Conn.

[21] Appl. No.: 811,987

[22] Filed: Mar. 5, 1997

Related U.S. Application Data

[62] Division of Ser. No. 666,940, Jun. 19, 1996.

[51] Int. Cl.⁶ .................................................. G01G 9/00
[52] U.S. Cl. .................... 73/865; 73/862.42; 73/760
[58] Field of Search ......................... 73/760, 781, 800, 73/862.42, 865, 432.1

[56] References Cited

U.S. PATENT DOCUMENTS

| | | | |
|---|---|---|---|
| 4,890,054 | 12/1989 | Maeno et al. | 324/640 |
| 4,975,578 | 12/1990 | Tomimasu et al. | 250/306 |
| 5,251,891 | 10/1993 | Blaser et al. | 271/176 |
| 5,293,118 | 3/1994 | Grossman et al. | 324/229 |

*Primary Examiner*—George M. Dombroske
*Assistant Examiner*—Max H. Noori
*Attorney, Agent, or Firm*—Tracy L. Hurt

[57] ABSTRACT

A system for transporting a sheet of material including an actuator, a position sensing system, and a tactile sensor system. The actuator imparts a known force to a sheet, moving it through to the position sensing system, which measures the sheet velocity at various points. Afterward, the sheet moves through the tactile sensor system, which determines the coefficient of friction of the sheet. Given these quantities, a controller can determine the mass of the sheet, which can be used alter the performance of the sheet transport system.

9 Claims, 12 Drawing Sheets

5,744,732

SHEET MATERIALS TRANSPORT SYSTEM

This application is a division of application Ser. No. 08/666,940, filed Jun. 19, 1996, now pending.

FIELD OF THE INVENTION

The present invention relates to sensor systems for sheet handling devices. In particular, the present invention relates to a sensor system for determining the mass of paper.

BACKGROUND OF THE INVENTION

A. Reproductive Machines

The quality of text or images written to or read from a markable medium such as paper by devices such as laser printers, xerographic printers, scanners, or ink jet printers depends upon physical characteristics of the medium. The thickness, curl, mass, and stiffness of the medium being marked all affect the speed and accuracy with which a printer can transport a sheet of the medium, as well as affecting the accuracy with which text or images can be transferred to the medium. Generally, printers and copiers work well only with a limited range of paper types, with a sheet transport mechanism optimized for that type. In extreme cases, reasonable print quality is only possible with specially developed paper supplied by the manufacturer and maintained in pristine condition, unbent and at certain humidity levels to limit curling. Sheets that are too thick, too thin, or even slightly curled may increase the risk of jamming or blocking the sheet transport mechanism.

One solution might be to provide various paper type settings for printers, copiers, and scanners to prevent errors in sheet transport, and increase image quality without necessarily requiring specific manufacturer supplied papers. For example, a user could manually select a "thick paper" setting if thicker papers or thin cardboard stock is to be fed through the sheet transport mechanism. Spacing of pinch rollers and speed of transport would then be automatically adjusted to compensate for the increased paper thickness. Unfortunately, this solution requires extra effort from a user to identify the correct grade or type of paper being supplied to the printer. Further, this system is somewhat unwieldy if multiple paper types are intermixed, since the "thick paper" setting must be regularly enabled and disabled by the user as various paper types are fed through the sheet transport mechanism.

Thus, a need exists for an inexpensive sheet handling system that automatically detects sheet properties, and automatically adjusts settings of a sheet transport mechanism to optimize sheet handling speed, spacing, or other sheet transport characteristics based on the detected sheet properties. Such a system would require minimal input from a user, and would automatically attempt to optimize its sheet handling characteristics to support use of a wide range of markable mediums. Such a sheet handling system would allow for greater use of recyclable papers of differing quality and consistency, and could limit sheet wastage by permitting use of lower quality or even slightly damaged sheets, while still providing transport results comparable to those of pristine, newly manufactured sheets.

B. Silicon Pressure Transducers

The drive toward miniaturization led to the development of silicon pressure transducers. FIG. 1 illustrates one typical prior silicon pressure transducer 100. Transducer 100 is a silicon (100) diaphragm 102 aligned with the <110> crystal orientations. The edges of silicon diaphragm 102 are 1 mm square. Diaphragm 102 includes four piezoresistors 124, 126, 128, and 130. Piezoresistors 124 and 128 are located perpendicular to their associated edges 104 and 108 and so close to their associated edges as to be in the region of maximum tensile stress. Piezoresistors 124 and 128 are stressed longitudinally when force is applied to diaphragm 102. In contrast, piezoresistors 126 and 130 are parallel to their associated edges and are located so close to their associated edges 106 and 110 as to be in the region of maximum compressive stress. Piezoresistors 126 and 130 are stressed transversely to their longitudinal axes when force is applied to diaphragm 102. These piezoresistors are coupled together in a Wheatstone bridge so that the resistance change due to the longitudinal stress ($+\Delta R$) of piezoresistors 124 and 128 balances the resistance change due to the transversal stress ($-\Delta R$) of piezoresistors 126 and 130. The output voltage of the Wheatstone bridge is proportional to the pressure applied to diaphragm 102, as is well known in the art.

FIG. 2A illustrates contours of constant deflection over a quarter of diaphragm 102 when uniformly pressurized. FIG. 2B illustrates contours of constant y-component of stress for a quarter of diaphragm 102 when uniformly pressurized.

SUMMARY OF THE INVENTION

An object of the present invention is to enable automatic adjustment of sheet handling in response to the mass of a sheet of a markable medium.

Another object of the present invention is to enable optimization of sheet transport mechanisms to permit use of a wide range of markable mediums.

A still further object of the present invention is reducing jams in sheet transport mechanisms.

These and other objects are satisfied by a mass measuring system including an actuator, a position sensing system, and a tactile sensor system. The actuator imparts a known force to a sheet, moving it through the position sensing system, which measures the sheet velocity at various points. Afterward, the sheet moves through the tactile sensor system, which determines the coefficient of friction of the sheet. Given these quantities, a controller can determine the mass of the sheet, which is used to alter the performance the paper transport path of a reproductive machine.

In another embodiment of the present invention, the mass measuring system includes an actuator, a position sensing system, and a subsystem for eliminating friction. The actuator applies a force to a sheet to move it into and through the subsystem. The position sensing system incorporated in the subsystem senses the acceleration of the sheet. Given this quantity, a controller determines the mass of the sheet.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

DETAILED DESCRIPTION OF THE PREFERRED EMBODIMENTS

Figure 1:
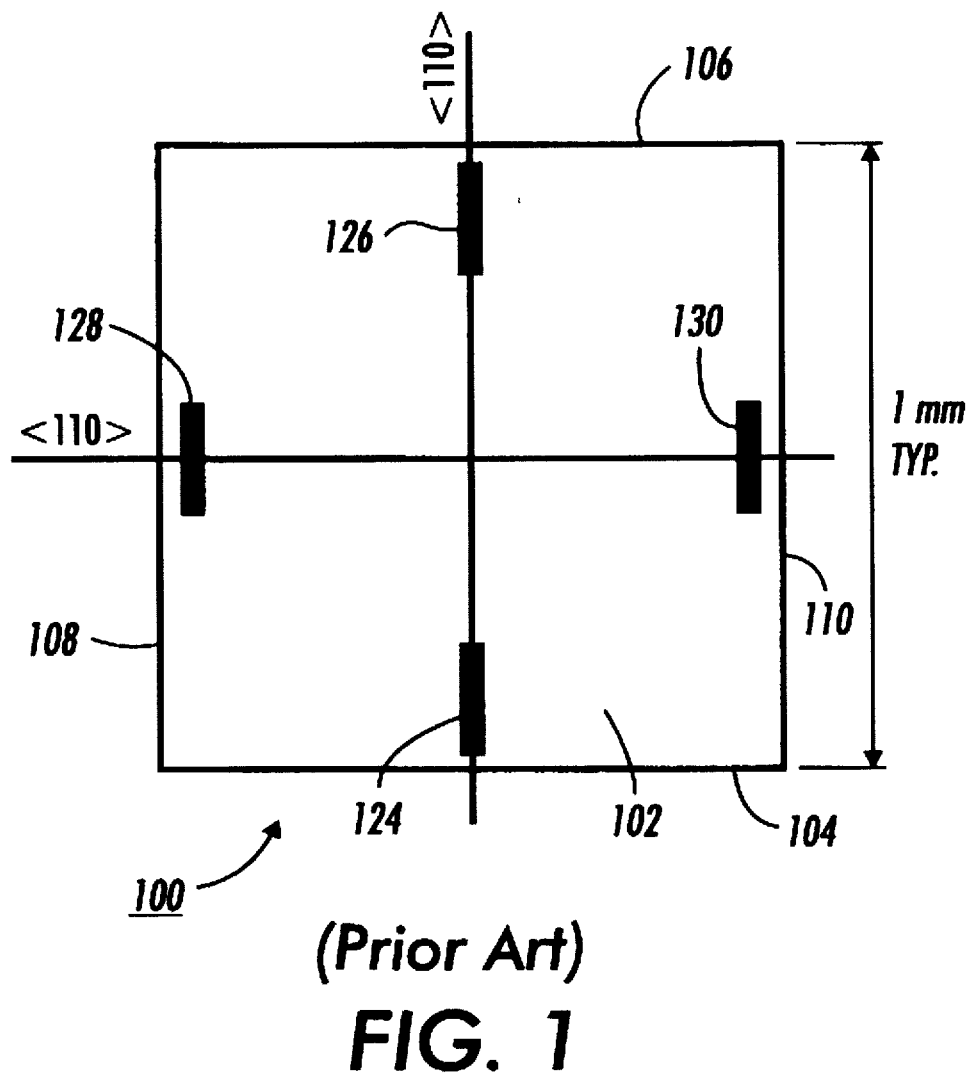
FIG. 1 illustrates a prior silicon pressure transducer.
Figure 2A:
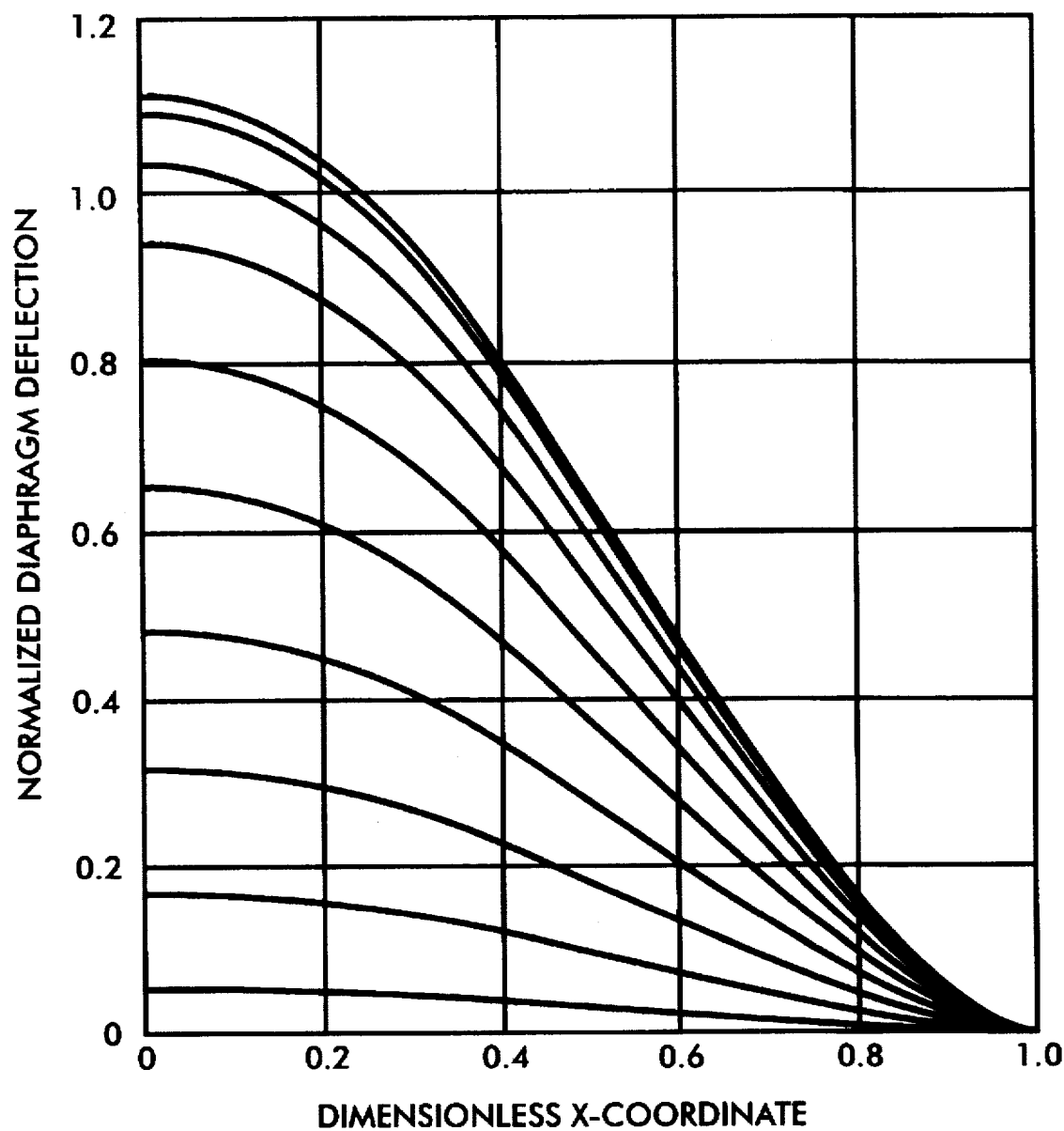
FIGS. 2A and 2B illustrate contours of constant deflection for the prior pressure transducer.
Figure 2B:
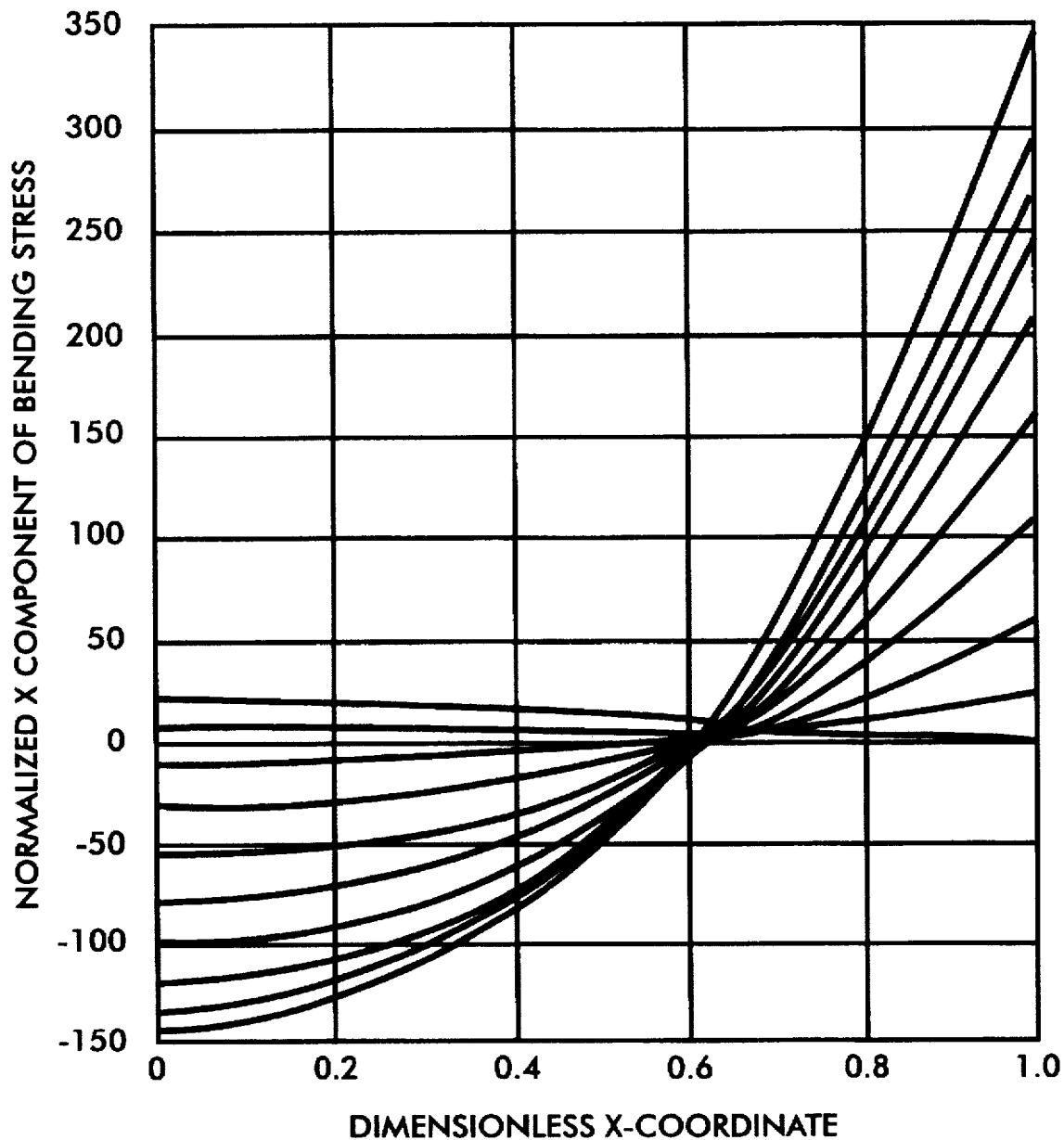
Figure 3:
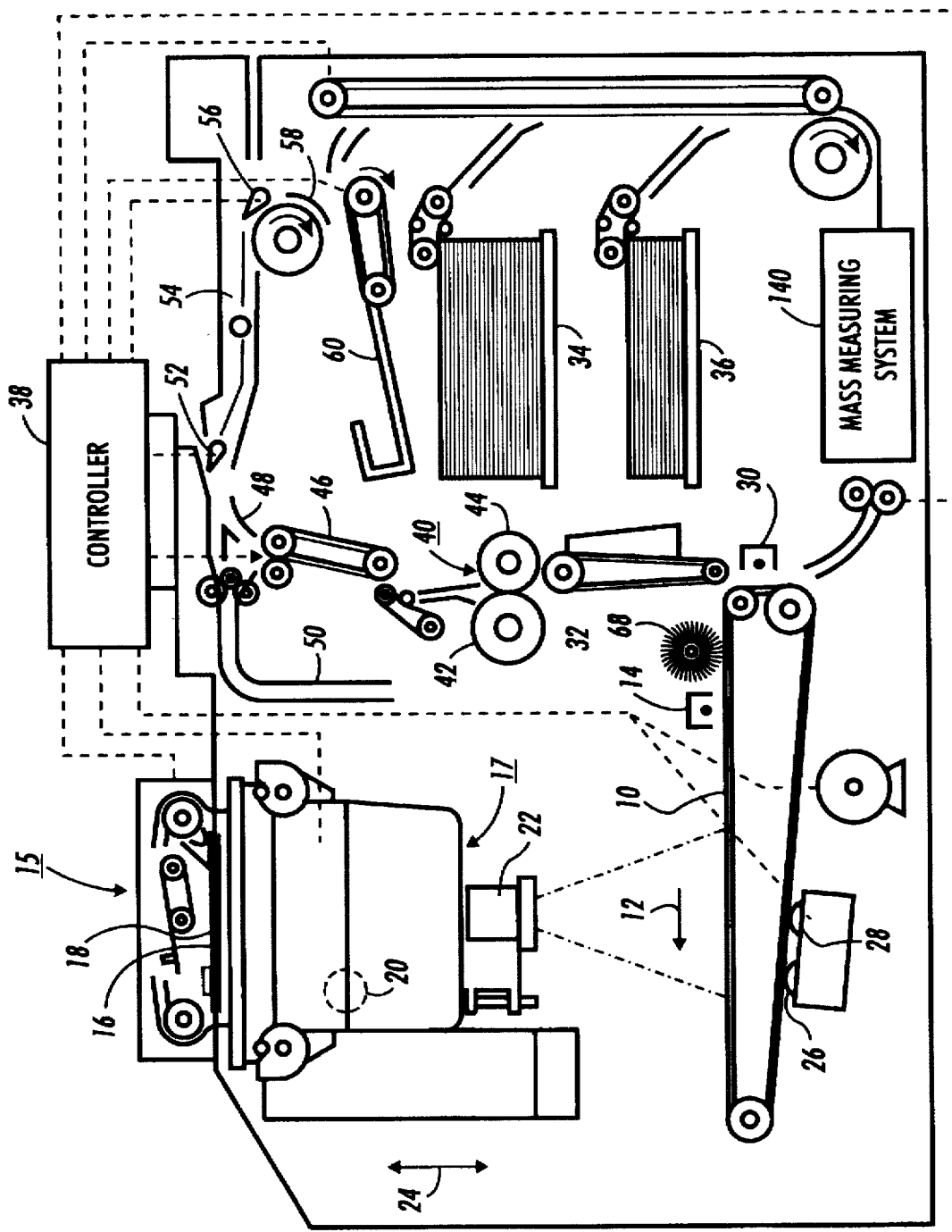
FIG. 3 illustrates a reproductive machine incorporating the mass measuring system of the present invention.

FIG. 3 illustrates a reproductive machine 9 incorporating mass measuring system 140 of the present invention. Mass measuring system 140 may be incorporated into any machine including a sheet transport mechanism. Mass measuring system 140 enables machines to alter their handling of sheets in response to the mass of the sheet currently within machine 9. Briefly described, in one embodiment mass measuring system 140 includes an actuator, a position sensing system, and a tactile sensor system. The actuator imparts a known force to a sheet, moving it through the position sensing system, which measures the sheet velocity at various points. Afterward, the sheet moves through the tactile sensor system, which determines the coefficient of friction of the sheet. Given these quantities, controller 38 can determine the mass of the sheet and alter the performance of reproductive machine 9 as appropriate.

In a second embodiment, the mass measuring system includes an actuator, a position sensing system, and a subsystem for eliminating friction. The actuator applies a force to a sheet to move it into and through the subsystem. The position sensing system incorporated in the subsystem senses the acceleration of the sheet. Given this quantity, controller 38 can determine the mass of the sheet.

A. The Reproductive Machine

Prior to a more detailed discussion of mass measuring system 140 of the present invention, consider reproductive device 9, illustrated in FIG. 3. Reproductive machine 9 includes a belt 10 having a photoconductive surface. Belt 10 moves in the direction of arrow 12 to advance successive portions of the photoconductive surface through various processing stations, starting with a charging station. The charging station includes corona generating device 14, which charges the photoconductive surface to a relatively high, substantially uniform, potential.

From the charging station, the photoconductive surface is advanced through an imaging station. At the imaging station, document handling unit 15 positions original document 16 face down over exposure system 17. Exposure system 17 includes lamp 20, which illuminates document 16 on transparent platen 18. The light rays reflected from document 16 are transmitted through lens 22, focusing the light onto the charged portion of belt 10 to selectively dissipate the charge. This records an electrostatic latent image onto the photoconductive surface of document 16.

Platen 18 is mounted movably and moves in the directions of arrows 24 to adjust the magnification of the original document being reproduced. Lens 22 moves synchronously with platen 18 to focus the light image of document 16 onto the charged portion of belt 10.

Document handling unit 15 sequentially feeds documents from a holding tray, in seriatim, to platen 18. Document handling unit 15 recirculates paper back to the stack supported on the tray. Thereafter, belt 10 advances to the electrostatic latent image to a development station.

At the development station a pair of magnetic brush developer rollers 26 and 28 advance a developer into contact with the electrostatic latent image on belt 10. The latent image attracts toner particles from the carrier granules of the developer to form a toner powder image on belt 10.

After development of the electrostatic latent image, belt 10 advances to the transfer station. At the transfer station a copy sheet is moved into contact with the toner powder image. The transfer station includes generating device 30, which sprays ions onto the backside of the copy sheet. This attracts the toner powder image from the photoconductive surface of belt 10 to the copy sheet.

The copy sheet is fed from either tray 34 or 36 to the transfer station. After transfer, conveyor 32 advances the sheet to a fusing station. The fusing station includes a fuser assembly for permanently affixing the transferred powder image to the copy sheet. Preferably, the fuser assembly includes a heated fuser roller 42 and a backup roller 44.

Mass measuring system 140 is disposed between copy paper trays 34 and 36 and conveyor 32 at any convenient location within the copy paper transport path. Information provided by mass measuring system 140 allows controller 38 to prevent jams by adjusting the speed of conveyors 32, 37 and 46, and the spacing between nips 39 and 41, and between rollers 42 and 44.

Controller 38 includes a processor and memory. The processor controls and coordinates the operations of reproductive machine 9 by executing instructions stored electronically in memory, including instructions for controlling mass measuring system 140. Instructions representing the methods discussed herein may be realized in any appropriate machine language. Semiconductor logic devices that can be used to realize memory include read only memories (ROM), random access memories (RAM), dynamic random access memories (DRAM), programmable read only memories (PROM), erasable programmable read only memories (EPROM), and electrically erasable programmable read only memories (EEPROM), such as flash memories.

B. The Mass Measuring System

Figure 4:
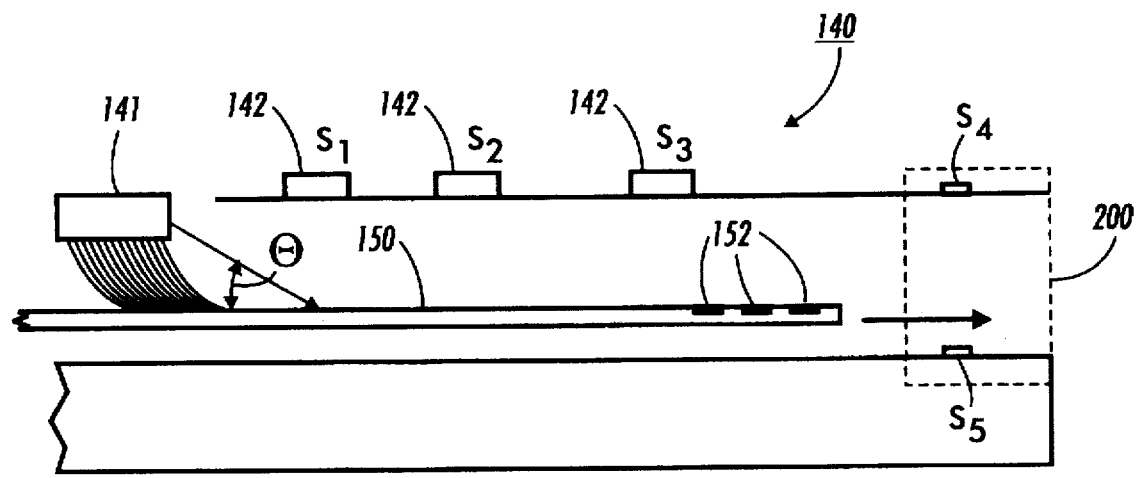
FIG. 4 illustrates an embodiment of a mass measuring system.

FIG. 4 illustrates a first embodiment of mass measuring system 140 in cross section, which includes actuator 141, a number of paper position sensors 142, and tactile sensor system 200. Actuator 141 can be realized using the microelectromechanical brushes described by Hadimioglu et al. in U.S. Pat. No. 5,467,975, incorporated herein by reference. Paper position sensors 142 are light generator-sensor pairs, similar to those used to automatically open store doors as someone approaches, which are well known in the prior art and will not be described in detail herein. Alternatively, paper position sensors 142 may be realized using commercially available sensors, which also will not be described in detail herein. Tactile sensor system 200 will be described in detail below in Section C. By applying a force of known magnitude, to sheet 150 with actuator 141 then sensing the acceleration of sheet 150 using paper position sensors 142 and the coefficient of friction with tactile sensor system 220, controller 38 can determine the mass of sheet 150.

Controller 38 uses information provided by position sensors $S_1$, $S_2$, and $S_3$ to determine the acceleration of sheet 150. Sensors $S_1$, $S_2$, and $S_3$ sense the arrival of the leading edge of sheet 150, or of marks 152. Combined with knowledge of the spacing between sensors 142 and the time between when sensors 142 sense the leading edge of paper the acceleration of sheet 150 can be determined. If sheet 150 arrives at sensor $S_1$ at time $t_1$, at sensor $S_2$ at time $t_2$, and at sensor $S_3$ at $t_3$, then the acceleration of sheet 150 is given by:

$$a = d^2x/dt^2 = dv/dt = (V_3 - V_2)/\Delta t,$$

where $$V_3 = (S_3 - S_2)/(t_3 - t_2),$$

$$V_2 = (S_2 - S_1)/(t_2 - t_1),$$

and $$\Delta t = t_3 - t_1.$$

Figure 5:
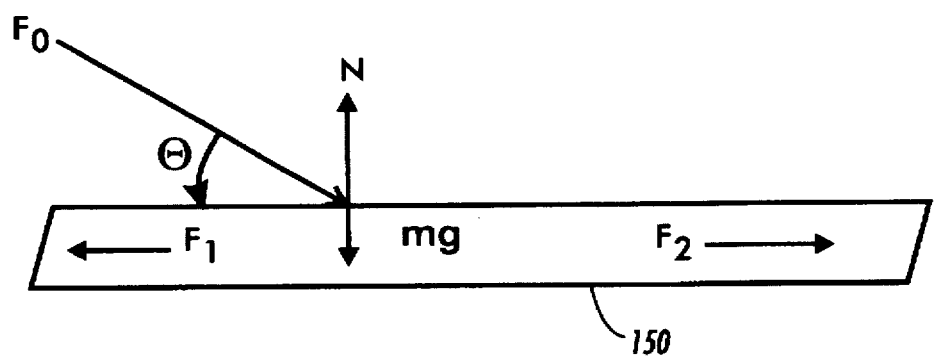
FIG. 5 illustrates forces applied to a sheet of material by the mass measuring system.

Having determined the acceleration of sheet 150, controller 38 can determine the mass of sheet 150 using the force diagram of FIG. 5. $F_o$ represents the force applied to sheet 150 by actuator 141 and $\theta$ represents the angle of this force to sheet 150. $F_1$ represents the drag of sheet 150 and can be expressed as a product of the force normal to sheet 150 imparted by actuator 141 and the coefficient of friction of the sheet of paper; i.e. $\mu N$. $F_2$ represents the shear force imparted to actuator 141 to sheet 150, represented as $F_o \cos \theta$. The mass of sheet 150 can be solved from the equation:

$$m_{sheet} * d^2x/dt^2 = F_2 - F_1.$$

By replacing $F_1$ and $F_2$ this equation can be simplified as follows:

$$m_{sheet} * d^2x/dt^2 = F_o \cos\theta - \mu N$$
$$= F_o \cos\theta - \mu[F_o \sin\theta + m_{sheet}g]$$
$$= F_o[\cos\theta - \mu \sin\theta] - \mu m_{sheet}g$$

$$m_{sheet} = F_o[\cos\theta - \mu \sin\theta]/[d^2x/dt^2 + \mu g]$$

Solving for the mass of sheet 150 given this equation requires determining the coefficient of friction, $\mu$, which is done using tactile sensor system 200.

After determining the mass of sheet 150, controller 38 takes a number of actions. Controller 38 compares the mass of sheet 150 to the acceptable range and if it is out of range, controller 38 halts the processing of reproductive machine 9 to prevent jams and provides an indication of the cause of the halt to the user of reproductive machine 9. If the mass of sheet 150 is acceptable, controller 38 optimizes the performance of the paper transport system of reproductive machine 9 by altering the speed of conveyors and/or changing the spacing between nips and rollers.

Figure 6:
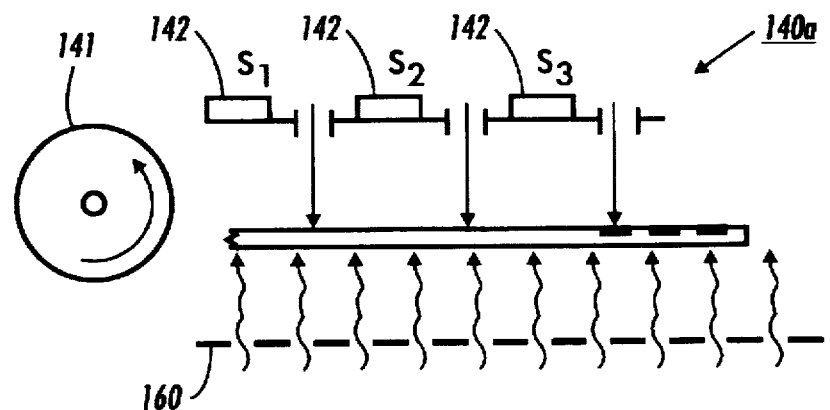
FIG. 6 illustrates an alternative embodiment of the mass measuring system.

FIG. 6 illustrates an alternative embodiment 140a of mass measuring system 140, which eliminates the need to measure the coefficient of friction by eliminating friction. Mass measuring system 140a includes actuator 141, a number of paper position sensors 142 and an air jet channel 160. Air jet channel 160 eliminates friction between sheet 150 and system 140a, thus eliminating the need for a tactile sensor system. Air jet channel 160 includes a pair of opposed, parallel surfaces that include air jets. One of these surfaces includes paper position sensors 142. Air jet channel 160 will be described in detail below in Section D.

Using air jet channel 160, the equation for the mass of sheet 150 simplifies to:

$$m_{sheet} = F_o[\cos\theta]/[d^2x/dt^2].$$

Thus, to determine the mass of sheet 150 with embodiment 140a, controller 38 need only determine the acceleration of sheet 150 using paper position sensors 142 in the same fashion described earlier. Controller 38 responds in the same fashion described earlier for the determination of sheet mass.

C. The Tactile Sensor System

1. The Tactile Sensor

Figure 7:
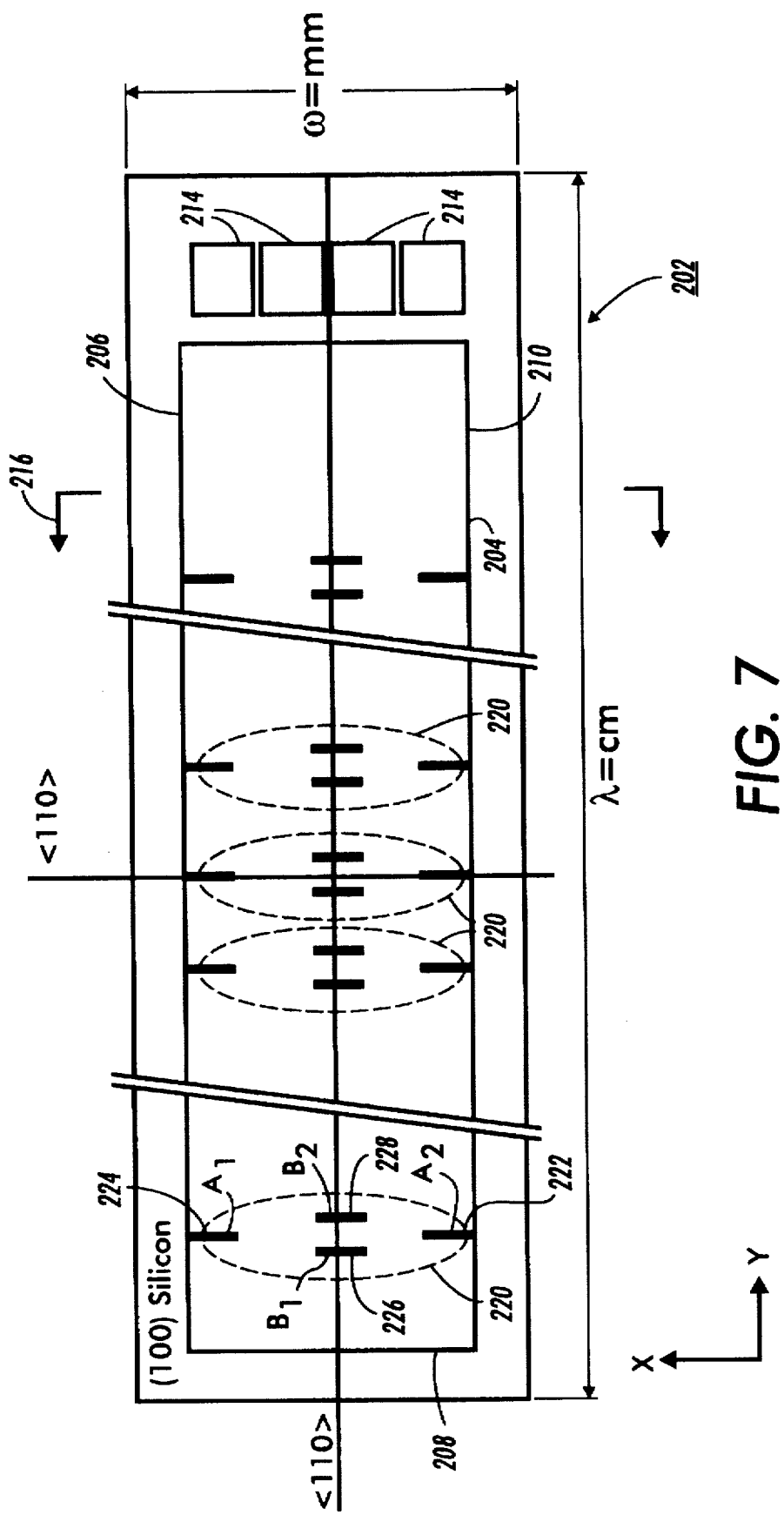
FIG. 7 illustrates a tactile sensor.

Tactile sensor system 200 includes at least one tactile sensor 202, enabling system 200 to measure both the thickness and coefficient of friction of any sheet of material in contact with and moving past tactile sensor 202. FIG. 7 is a plan view of tactile sensor 202. Tactile sensor 202 is a rectangular silicon (100) diaphragm aligned with the <110> crystal orientations, into which several pairs of piezoresistors have been diffused. Preferably, diaphragm 202 is n-type silicon while the piezoresistors are p-type. Parallel, opposed sides 204 and 206 range between 1–2 cm in length, while parallel, opposed sides 208 and 210 range between 1–3 mm in length. Other dimensions are possible; however, the aspect ratio should be greater than 1; i.e., the diaphragm should not be square for performance reasons. The depth of silicon diaphragm 202 is small compared to its width, preferably, less than a tenth of the width. Diaphragm 202 is clamped along edges 204, 206, 208, and 210, above a cavity not illustrated in this figure.

Diaphragm 202 includes several taxels 220, each of which includes two pairs of piezoresistors. Piezoresistors 222 and 224, also designated A2 and A1, form one pair, and piezoresistors 226 and 228, also designated B1 and B2, form another pair. Both piezoresistors 222 and 224 are located perpendicular to their associated edges 204 and 206. Piezoresistors 222 and 222 reside so close to their associated edges that they experience the highest compressive stress ($-\Delta R$). When pressure is applied to diaphragm 202, piezoresistors 222 and 224 experience force primarily along their longitudinal axes. Piezoresistors 226 and 228 are located between and parallel to piezoresistors 222. They are also spaced apart from and parallel to each other. Piezoresistors 226 and 228 each reside at least one half the length of edge 208 away from both edges 208 and 210. As a result, piezoresistors 226 and 228 experience force primarily along their longitudinal axes when force is applied to diaphragm 202. Piezoresistors 202 reside within the region of maximum tensile stress ($+\Delta R$).

Figure 8A:
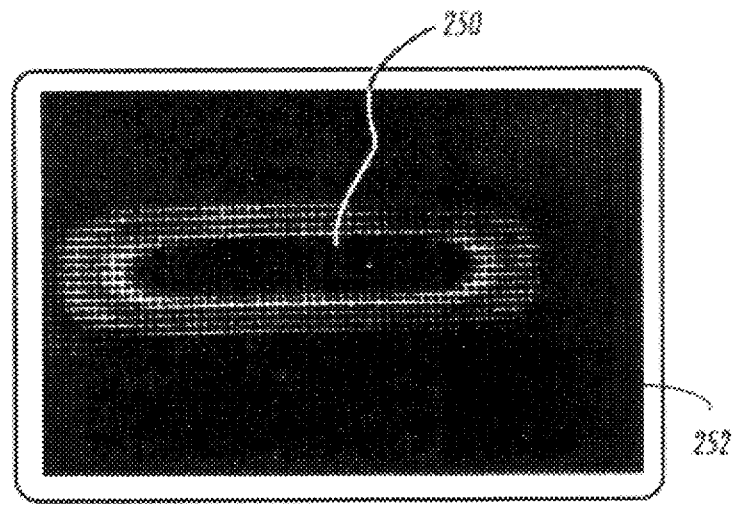
FIGS. 8A and 8B illustrate contours of constant deflection for the tactile sensor.
Figure 8B:
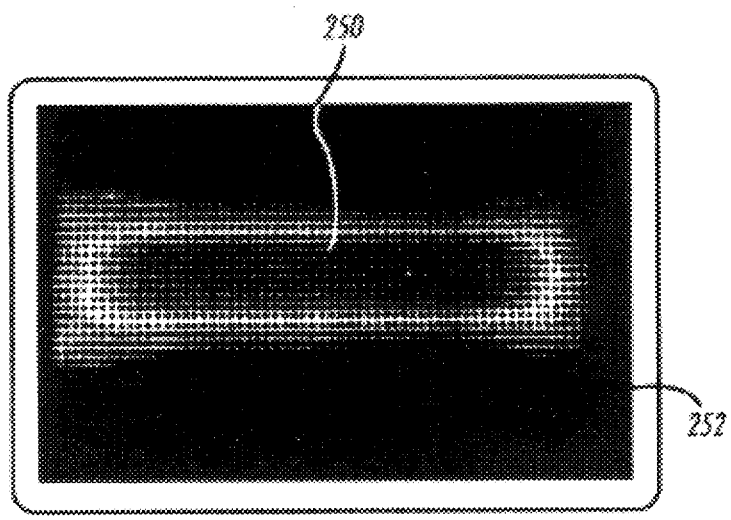

FIG. 8A illustrates contours of constant z-deflection for diaphragm 202. FIG. 8B illustrates contours of constant y-component of stress for diaphragm 202. Within FIG. 8B center black region 250 indicates the area of highest tensile stress within diaphragm 202. Piezoresistors B1 and B2 reside here. Outer black region 252 of FIG. 8B indicates the areas of highest compressive stress within diaphragm 202; this is where piezoresistors A1 and A2 reside.

Figure 9A:
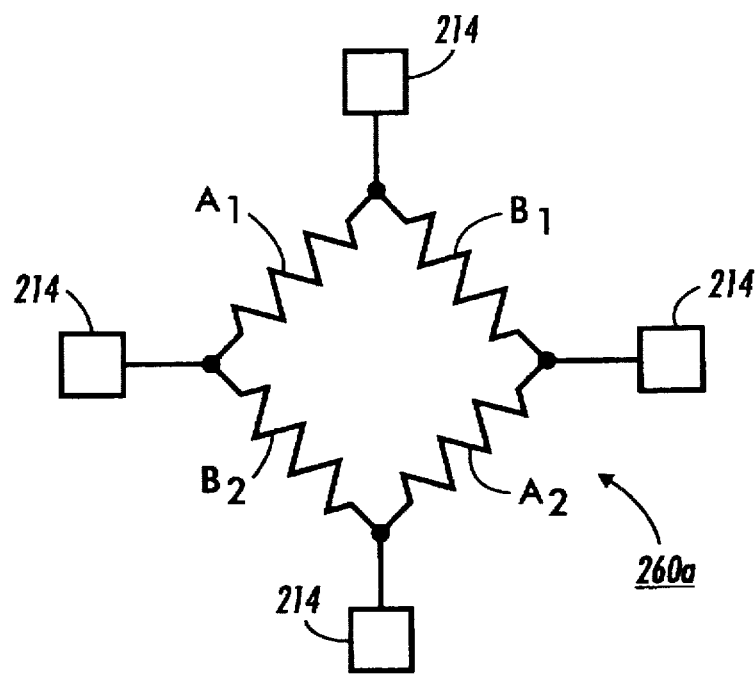
FIG. 9A illustrates a Wheatstone Bridge configuration for measuring normal force.
Figure 9B:
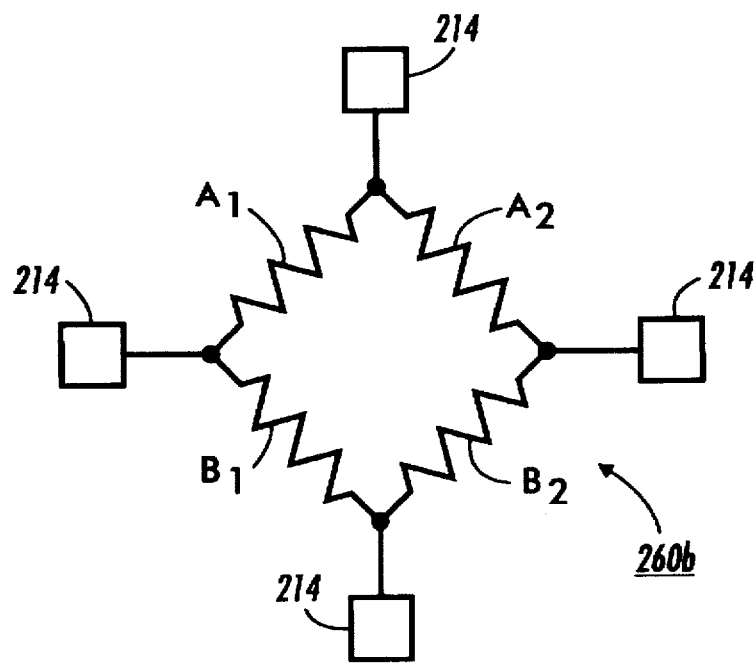
FIG. 9B illustrates a Wheatstone Bridge configuration for measuring shear force.

To measure normal force exerted on a taxel, the piezoresistors of each taxel 220 are coupled together in a Wheatstone Bridge 260a, as shown in FIG. 9A. FIG. 9B illustrates Wheatstone Bridge 260b, used to measure the shear force applied to a taxel. Junctions between piezoresistors are coupled to bond pads 214.

Figure 10A:
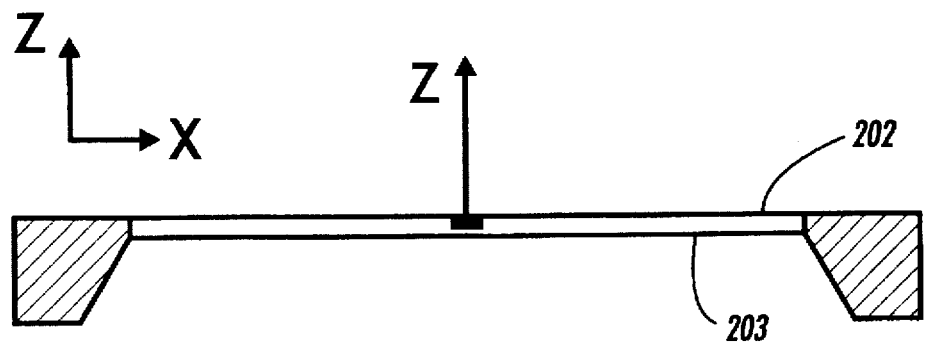
FIGS. 10A, 10B, and 10C are cross-sectional views of the tactile sensor.
Figure 10B:
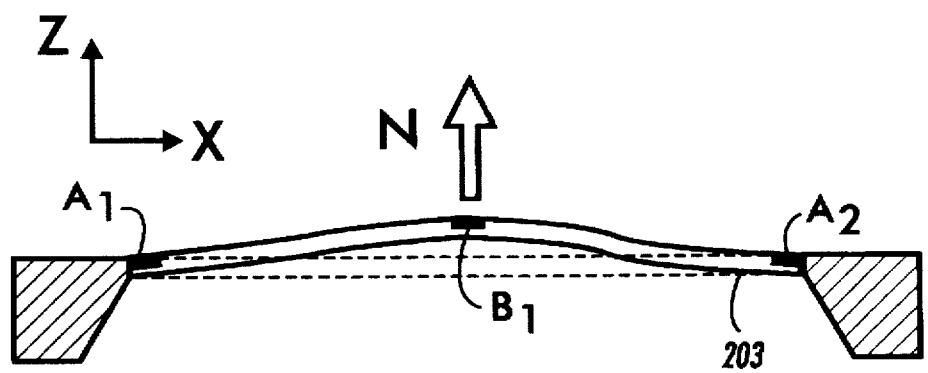
Figure 10C:
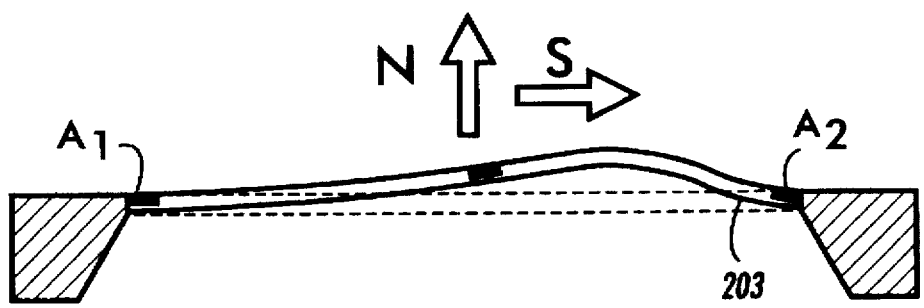

FIG. 10A is a cross-section of diaphragm 202 taken along line 216 of FIG. 7, as are FIGS. 10B and 10C. These cross-sections reveal cavity 203 underneath diaphragm 202. In the absence of pressure, diaphragm 202 is level. FIG. 10B illustrates the deformation of diaphragm 202 when subjected to a normal force, N. Normal force, N, flexes diaphragm 202 symmetrically relative to the z-axis, inducing equal stress in piezoresistors A1 and A2. Using outputs from Wheatstone Bridge 260a normal force, N, is calculated according to the formula:

$$N \propto [(A1-B1)+(A2-B2)]/2.$$

Normal force, N, is a measure of the thickness of a sheet of material passing over diaphragm 202.

FIG. 10C illustrates the deformation of diaphragm 202 when subjected to both a normal force, N, and a shear force, S. Shear force, S, causes asymmetrical deformation, inducing unequal stress in piezoresistors A1 and A2. Using the outputs of Wheatstone Bridge 260b, shear force, S, can be calculated according to the formula:

$$S \propto [A1-A2].$$

The ratio of shear force, S, to normal force, N, is a measure of the coefficient of friction of sheet 150 passing over diaphragm 202.

Tactile sensor 202, like many other micromachined devices, can be produced using standard semiconductor batch fabrication and wafer processing.

2. The Tactile Sensor System

Figure 11:
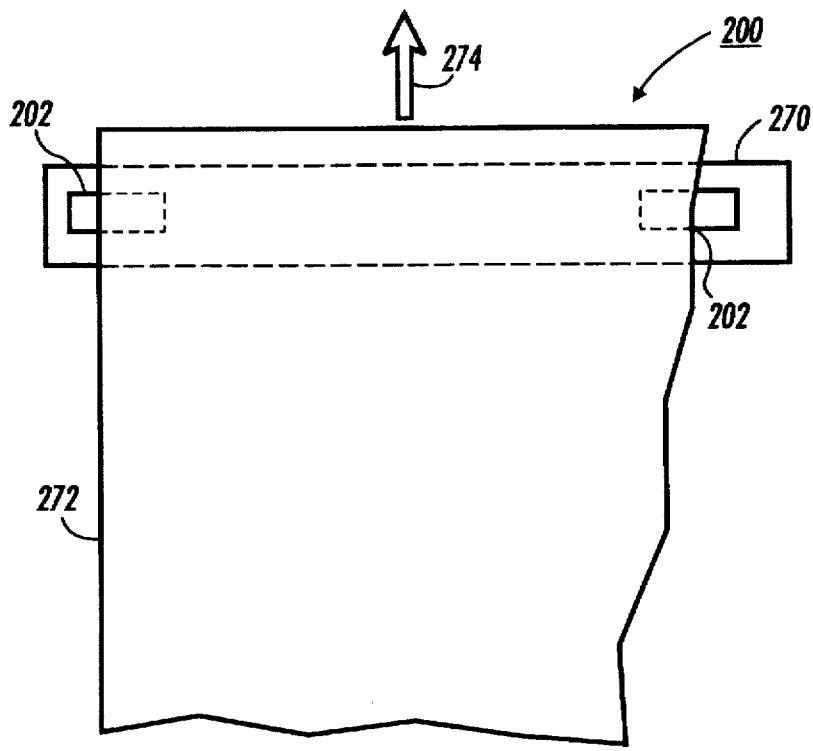
FIG. 11 is a plan view of the tactile sensor system.

FIG. 11 is a plan view of tactile sensor system 200. Tactile sensor system 200 is a nip, only one surface of which is illustrated, surface 270. Both surfaces of nip 200 contact sheet 272 as it moves between them in the direction of arrows 274. Tactile arrays 202 of surface 270 are preferably in contact with the opposite surface when sheet 272 is not present. This approach eliminates the need for tight tolerances required in embodiments of tactile sensor system 200 with gaps between surface 270 and its opposite surface. Permanent contact between tactile array 202 and the opposite surface is achieved via an overpressure, ΔP, of diaphragms 202. Constant overpressure ΔP can be achieved be sealing cavities 203 underneath diaphragms 202. Alternatively, overpressure ΔP can be modulated using a heater resistance to measure the pressure change required to keep the reaction force constant.

Figure 12:
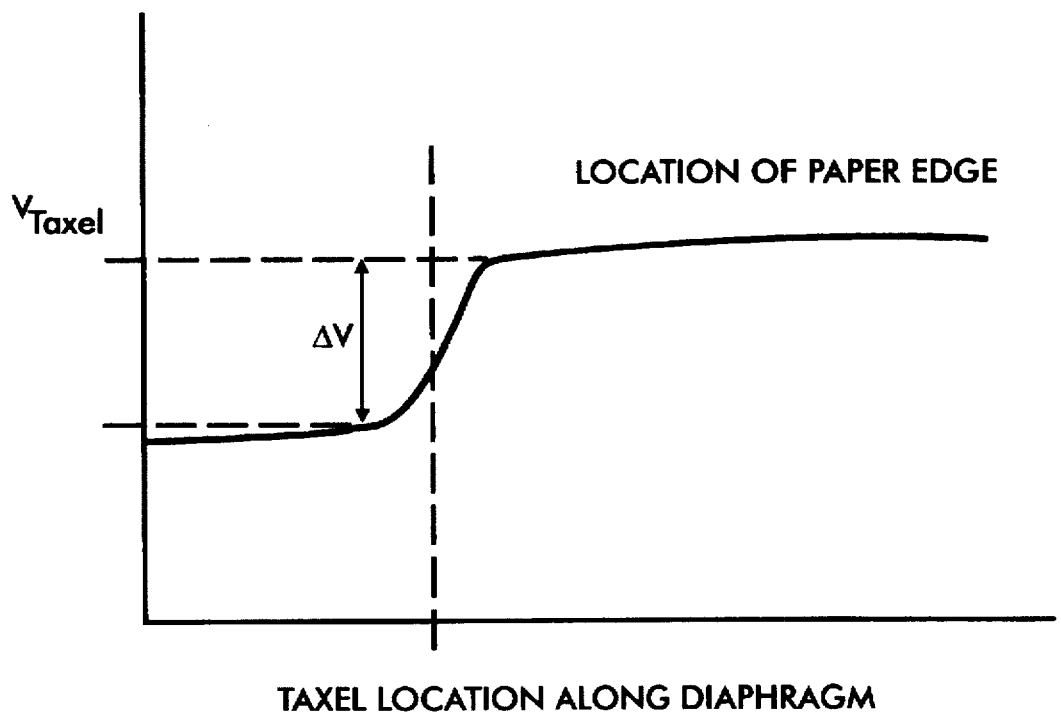
FIG. 12 is a plot of taxel output voltage versus location within the tactile array.

Tactile arrays 202 are preferably located along the longitudinal axis of surface 270 such that some of the taxels contact paper 272, and some taxels do not, as sheet 272 travels through nip 202. In combination with the constant contact, this permits differential measurements to be taken in space and in time. Differential measurements in space result from taking the output of taxels in contact with sheet 272 versus the output of taxels not in contact with paper 272. FIG. 12 graphs taxel output voltage versus taxel location. Contact with sheet 272 leads to an increase, ΔV, in taxel output voltage, which can be used to identify the edge of paper 272. Differential measurements in time result from taking the output of taxels while sheet 272 is in nip 200 versus the output of taxels without sheet 272 in nip 200.

Figure 13:
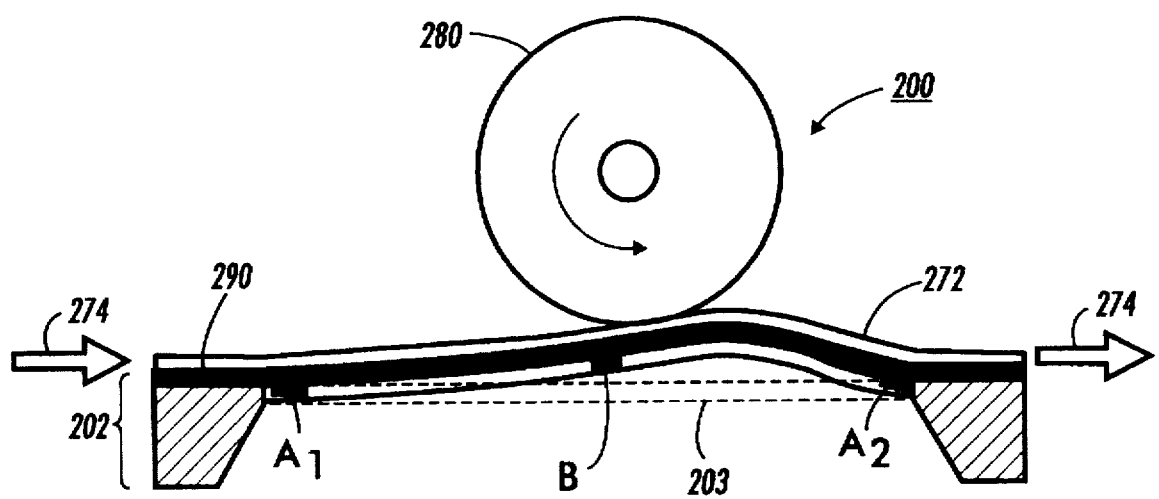
FIG. 13 is a cross-sectional view of a first embodiment of the tactile sensor system.
Figure 14:
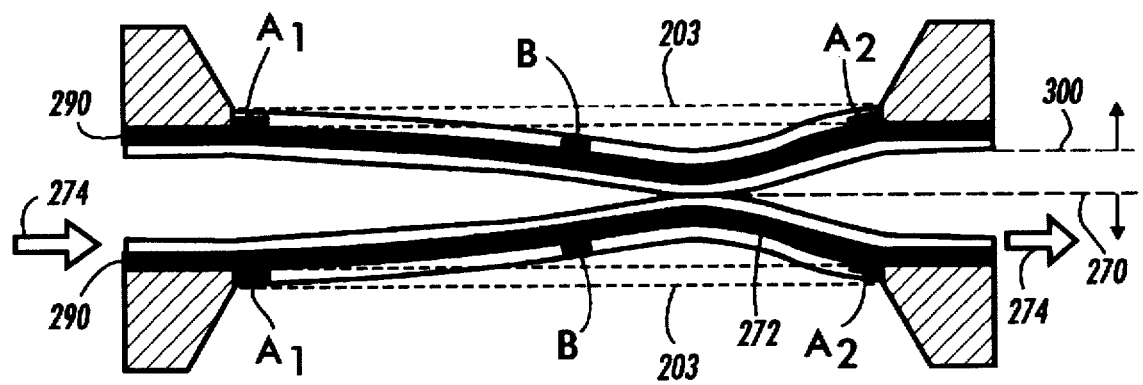
FIG. 14 is a cross-sectional view a second embodiment of the tactile sensor system

FIG. 13 illustrates in cross section one embodiment of paper property sensor system 200. Roller 280 opposes surface 270 and its tactile arrays 202. Arrows 274 indicate the direction of sheet 272 through nip 200. Skin 290 protects diaphragm 202 from abrasion and distributes forces uniformly over tactile array 202. FIG. 14 illustrates in cross section another embodiment of paper property sensor system 200, two surfaces 270 and 300 opposed to each other. Each surface includes tactile arrays in opposition to those of the other surface.

D. The Jet Air Channel

Figure 15:
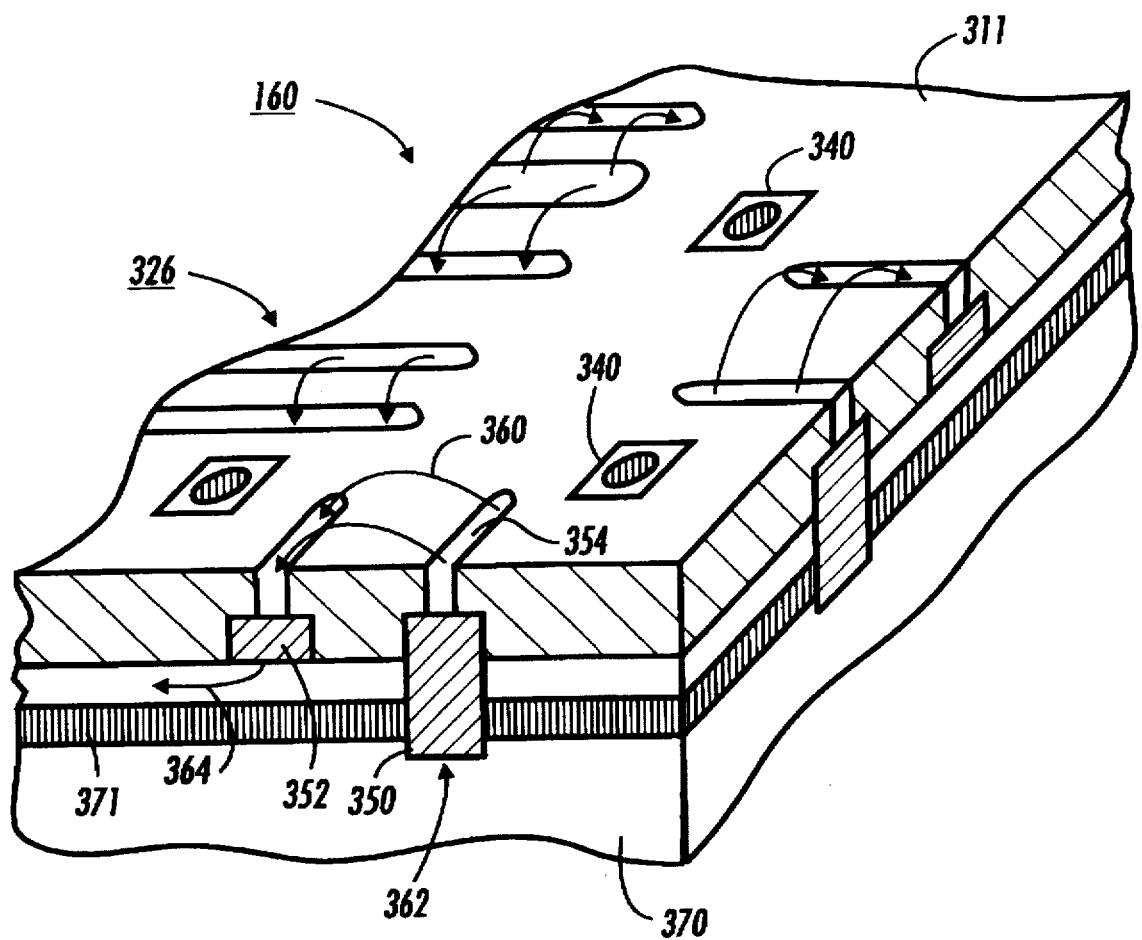
FIG. 15 illustrates a surface of an air jet channel.

FIG. 15 illustrates one air jet surface of an architecture of air jet channel 160 suitable for use in the present invention. Each air jet surface of channel 160 includes a variety of air jets 326 for enabling longitudinal, lateral, and vertical transport of sheet 150, which is not illustrated for clarity. Air jets 326 include channels 354 defined in the table surface 311 to allow exit or entrance of flowing air 360. For example, a valve 350 can be selectively operated to permit high pressure air in plenum 370 to flow upward, impart momentum to sheets, and pass downward through valve 352 and into plenum 372. As shown in FIG. 15, plenum 572 is separated from plenum 370 by partition 371, with plenum 372 being maintained at a lower air pressure than plenum 370.

Typically, air jets 326 must be constructed and positioned with respect to sheet 150 to enable application of on the order of one millinewton of force to each side of sheet 150, with precise force values depending on material and dynamic properties of sheet 150, along with the desired object acceleration and trajectory. For best operation, the exerted air jet forces must be quickly changeable. For example, a typical 0.025 cm diameter orifice having a length of about 0.1 centimeter would be expected to have an intrinsic response time for air movement on the order of 100 microseconds. Of course valve response times, controllers, motion analysis, and pressure conditions must also be such that air jet operation and control occurs on a millisecond time scale.

Control of the path of sheet is enabled by a plurality of integrated sensors 540, which can include, but are not limited to, optical, mechanical, thermal, electrostatic, or acoustic sensors. Sensors 340 provide near continuous sensor feedback relating to sheet position, which in turn allows nearly continuous movement control of sheet 150 passing adjacent to air jets 326. As will be appreciated, information received from sensors 340 can be passed to controller 38. Alternatively, distributed or local motion analysis and control can be employed. For example, sensors 340 can be integrated with computer microcircuitry capable of analyzing sensor input and directing control of air jets.

E. Conclusion

Thus, a mass measuring system for sheets of paper has been described that includes an actuator, a position sensing system, and a tactile sensor system. The actuator imparts a known force to a sheet, moving it through to the position sensing system, which measures the sheet velocity at various points. Afterward, the sheet moves through the tactile sensor system, which determines the coefficient of friction of the sheet. Given these quantities, a controller can determine the mass of the sheet and alter the performance of a reproductive machine as appropriate. A second embodiment of the mass measuring system has been described that includes an actuator, a position sensing system, and a subsystem for eliminating friction. The actuator applies a force to a sheet to move it into and through the subsystem. The position sensing system incorporated in the subsystem senses the acceleration of the sheet. Given this quantity, a controller can determine the mass of the sheet.

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

What is claimed is:

1. A system for transporting a sheet of material, the system comprising:
   a) a nip having a first surface and a second surface separated by a first distance, the sheet of material passing between the first surface and the second surface;
   b) a conveyor coupled to the nip for conveying the sheet of material, the conveyor having a first speed;
   c) a mass measuring system for measuring a mass of the sheet of material and modifying a one of the first distance and the first speed, the mass measuring system including:
      1) an actuator for imparting a force of a known magnitude to the sheet of material;
      2) a position sensing system adjacent to the actuator for generating a first electrical signal representative of an acceleration of the sheet of material;
      3) a tactile sensor system adjacent to the first sensor system for generating a second electrical signal representative of a coefficient of friction of the sheet of material;
      4) a processor for generating a third electrical signal representative of a mass of the sheet of material in response to the first electrical signal, the second electrical signal, and the known magnitude of the force imparted to the sheet of material.

2. The system of claim 1 wherein the tactile sensor system comprises:
   A) a third surface in contact with the sheet of material; and
   B) a first diaphragm located opposite the third surface and in contact with the sheet of material, the diaphragm being rectangular and having a pair of short edges and a pair of longer edges, the longer edges being less than 2 cm in length, the short edges having a first length, the diaphragm including a first pair of piezoresistors and second pair of piezoresistors,
   each piezoresistor of the first pair being located adjacent and perpendicular to a one of the longer edges,
   each piezoresistor of the second pair being located between the first pair of piezoresistors and perpendicular to a one of the longer edges, each piezoresistor of the second pair being located at least a half of the first length away from each of the short edges;
   the first pair and the second pair of piezoresistors being coupled together electrically to produce a fourth electrical signal representative of a coefficient of friction of the sheet of material.

3. The system of claim 2 wherein the position sensing system comprises a multiplicity of light generators and a multiplicity of light sensors.

4. The system of claim 3 wherein the actuator imparts the force at an angle, θ, to the sheet of material.

5. The system of claim 4 wherein the processor determines the mass, m, of the sheet of material according to an equation:

$$m = F_o [\cos\theta - \mu \sin\theta]/[d^2x/dt^2 + \mu g];$$

where:

$F_o$ represents the force applied to the sheet;

θ represents the angle of $F_o$ to the sheet;

μ represents the coefficient of friction;

g represents the force of gravity; and $d^2x/dt^2$ represents the acceleration of the sheet.

6. A system for transporting a sheet of material, the system comprising:
   a) a nip having a first surface and a second surface separated by a first distance, the sheet of material passing between the first surface and the second surface;
   b) a conveyor coupled to the nip for conveying the sheet of material, the conveyor having a first speed;
   c) a mass measuring system for measuring a mass of the sheet of material and modifying a one of the first distance and the first speed, the mass measuring system including:
      1) an actuator for imparting a force of a known magnitude to the sheet of material;
      2) a position sensing system adjacent to the actuator for generating a first electrical signal representative of an acceleration of the sheet of material;
      3) an air jet channel coupled to the position sensing system for eliminating friction on the sheet of material while the acceleration is measured;
      4) a processor for generating a second electrical signal representative of a mass of the sheet of material in response to the first electrical signal and the known magnitude of the force imparted to the sheet of material.

7. The system of claim 6 wherein the position sensing system comprises a multiplicity of light generators and a multiplicity of light sensors.

8. The system of claim 7 wherein the actuator imparts the force at an angle, θ, to the sheet of material.

9. The system of claim 8 wherein the processor determines the mass, m, of the sheet of material according to an equation:

$$m = F_o [\cos\theta]/[d^2x/dt^2];$$

where:

$F_o$ represents the force applied to the sheet;

θ represents the angle of $F_o$ to the sheet; and $d^2x/dt^2$ represents the acceleration of the sheet.

* * * * *